United States Patent [19]
Kageyama

[11] Patent Number: 5,612,581
[45] Date of Patent: Mar. 18, 1997

[54] POWER SUPPLY APPARATUS WITH A BACK-UP POWER UNIT

[75] Inventor: Hironobu Kageyama, Kawasaki, Japan

[73] Assignee: Fujitsu Limited, Kawasaki, Japan

[21] Appl. No.: 551,414

[22] Filed: Nov. 1, 1995

[30] Foreign Application Priority Data

Jan. 18, 1995 [JP] Japan .................................. 7-005895

[51] Int. Cl.⁶ ............................... H02J 7/00; H02M 7/68
[52] U.S. Cl. ................................ 307/64; 307/66; 363/65
[58] Field of Search .......................... 363/65, 71; 307/18, 307/23, 26, 46, 48, 64, 66

[56] References Cited

U.S. PATENT DOCUMENTS

| | | | |
|---|---|---|---|
| 3,818,237 | 6/1974 | Straus | 307/64 |
| 4,675,538 | 6/1987 | Epstein | 307/66 |
| 4,876,460 | 10/1989 | Johnson | 307/64 |
| 4,894,764 | 1/1990 | Meyer et al. | 363/65 |
| 5,532,914 | 7/1996 | Kageyama et al. | 363/65 |

*Primary Examiner*—Matthew V. Nguyen
*Attorney, Agent, or Firm*—Nikaido, Marmelstein, Murray & Oram LLP

[57] ABSTRACT

A power supply apparatus with a back-up power unit includes: a plurality of AC-DC conversion units each connected in parallel to a commercial AC power source, and each converting an AC voltage of said power source to a high DC voltage; a plurality of DC-DC conversion units each connected to an output of each AC-DC conversion unit, each converting the high DC voltage to a low DC voltage to be supplied to a load, and each output thereof connected in parallel to said load; and a back-up power unit connected in parallel to the output of each AC-DC conversion unit through a first and second diodes in order to supply the high DC voltage to the DC-DC conversion unit when a failure occurs in the AC power source.

6 Claims, 6 Drawing Sheets

POWER SUPPLY APPARATUS WITH A BACK-UP POWER UNIT

BACKGROUND OF THE INVENTION

1. Field of the Invention

The present invention relates to a power supply apparatus in an information processing system, particularly, it relates to the structure of a back-up power unit provided in a power supply apparatus.

2. Description of the Related Art

In general, a power supply apparatus used for an information processing system is formed by a plurality of power units each connected in parallel to a commercial AC (alternating current) power source, and each power unit includes a back-up battery. To connect power units in parallel and to provide the back-up battery give high reliability to the system when a failure accidentally occurs in the system.

For example, if a failure occurs in an active power unit, the power is immediately switched to another stand-by power unit. Further, if a failure occurs in the commercial AC power source, the power is immediately switched to the back-up battery.

On the other hand, there is a very important problem in the above power supply apparatus formed by a plurality of power units and a back-up battery. This is, how to prevent a current leakage flowing from the active power unit to another stand-by power unit through the back-up battery. In this case, how many batteries can be provided and where the battery should be located in the power supply apparatus, are very important questions since the answers influence the current leakage as explained in detail below.

SUMMARY OF THE INVENTION

The object of the present invention is to provide a power supply apparatus with a back-up power unit which can prevent current leakage flowing from the active power unit to another stand-by power unit through a back-up power unit.

In accordance with the present invention, there is provided a power supply apparatus with a back-up power unit including:

a plurality of AC-DC conversion units each connected in parallel to an AC power source, and each converting an AC voltage of said power source to a high DC voltage;

a plurality of DC-DC conversion units each connected to an output of each AC-DC conversion unit, each converting the high DC voltage to a low DC voltage to be supplied to a load, and each output thereof connected in parallel to said load; and a back-up power unit connected in parallel to the output of each AC-DC conversion unit through a first and a second diode in order to supply the high DC voltage to the DC-DC conversion unit when a failure occurs in the AC power source;

wherein the first diode is connected between a positive line of the AC-DC conversion unit and a positive side of the back-up unit in accordance with a connection direction in which the cathode of the first diode is connected to the positive line and the anode thereof is connected to the positive side, and the second diode is connected between a negative line of the AC-DC conversion unit and a negative side of the back-up unit in accordance with a connection direction in which the anode of the second diode is connected to the negative line and the cathode thereof is connected to the negative side.

In a preferred embodiment, the back-up power unit comprises a battery.

In another preferred embodiment, the back-up power unit comprises a condenser.

In still another preferred embodiment, a resistor provided instead of the second diode, and the resistor has a very large resistance value compared to the line impedance of the negative line.

In still another preferred embodiment, the condenser is charged by the current flowing from the positive line of the AC-DC conversion unit to the positive side of the condenser, and returns from the negative side to the negative line of the AC-DC conversion unit through another diode which is connected to the negative line and has a direction opposite to the second diode, in a normal state which no failure occurs in the AC power source.

In sill another preferred embodiment, the condenser is discharged by the current flowing from the positive side of the condenser to the positive line of the AC-DC conversion unit through the first diode, and returns from the negative line of the AC-DC conversion unit to the negative side through the second diode, when a failure occurs in the AC power source.

DESCRIPTION OF THE PREFERRED EMBODIMENTS

Before describing preferred embodiments, a conventional art and its problem will be explained in detail below.

Figure 1:
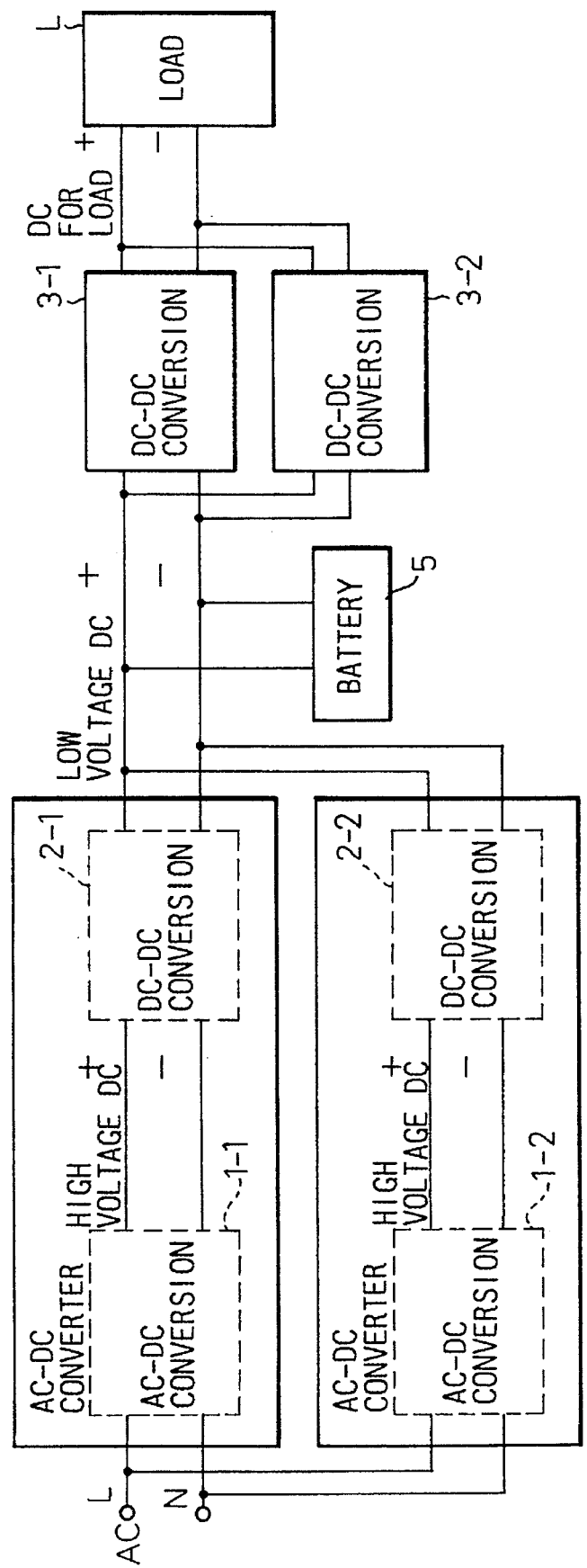
FIG. 1 shows one example of a power supply apparatus with a back-up battery in a conventional art.
Figure 2:
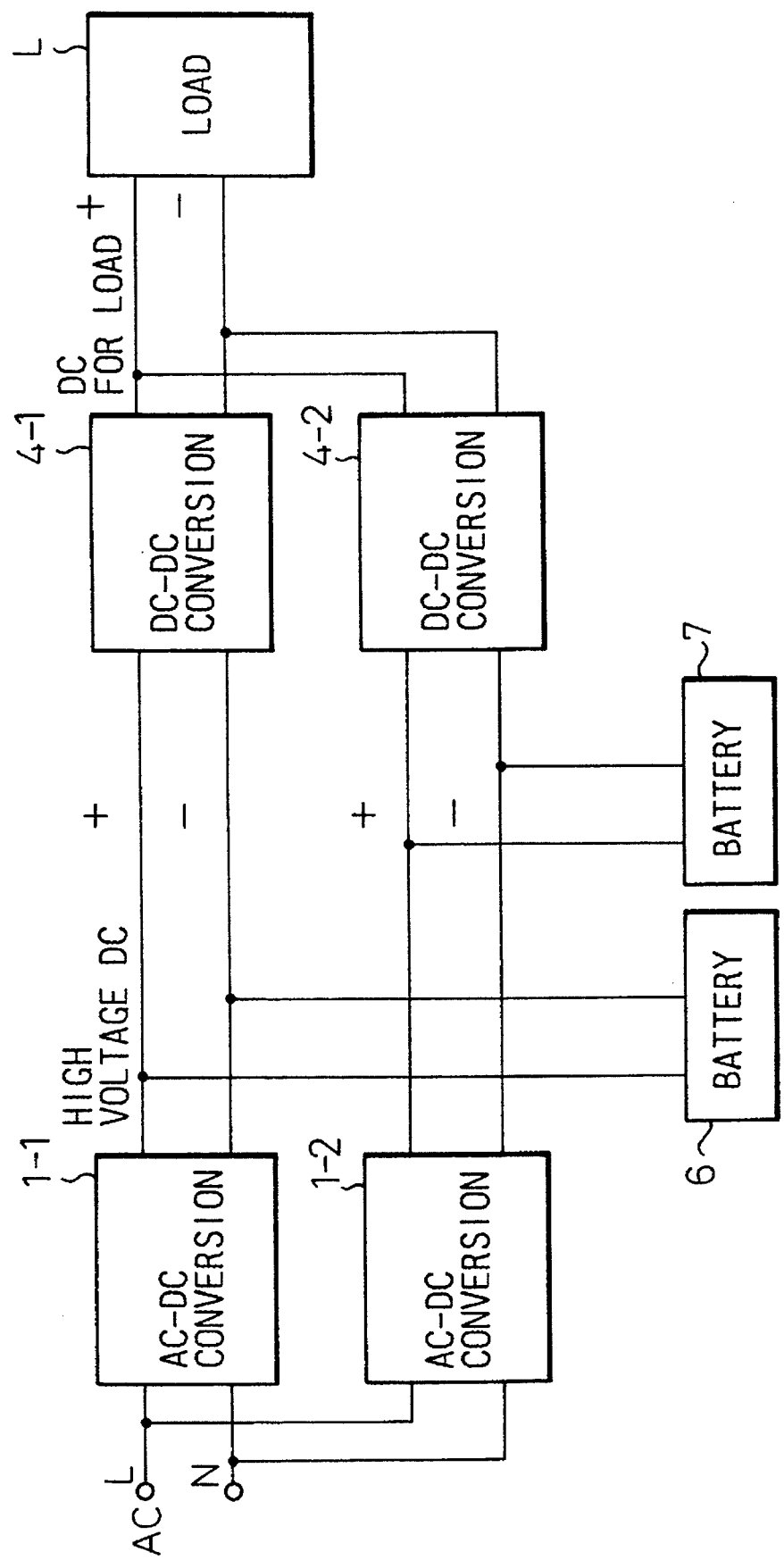
FIG. 2 shows another example of a power supply apparatus with back-up batteries in a conventional art.

FIG. 1 shows one example of a power supply apparatus with a back-up battery in a conventional art, and FIG. 2 shows another example of a power supply apparatus with back-up power batteries in a conventional art.

In these drawings, an AC denotes a commercial alternating current (AC) power source. In general, the AC power is supplied to a plurality of power units each connected in parallel thereto. Each power unit includes an AC-DC converter and at least one DC-DC conversion unit.

In FIG. 1, two AC-DC converters are connected in parallel to the AC power source. Each AC-DC converter includes an AC-DC conversion unit 1 (1-1, 1-2) and an intermediate DC-DC conversion unit 2 (2-1, 2-2). The AC-DC conversion unit 1 converts a commercial AC voltage (AC 100V) to a high DC voltage (for example, DC 200V), and the intermediate DC-DC conversion unit 2 converts the high DC-voltage to a low DC voltage (for example, DC 60V).

Further, two DC-DC conversion units 3 (3-1, 3-2) are connected in parallel to a common output of the intermediate DC-DC conversion units 2-1, 2-2. Each DC-DC conversion unit 3 converts the low DC voltage to the low voltage actually used (actual low DC voltage) for a load which is connected to a common output of the DC-DC conversion units 3-1, 3-2.

In this example, the back-up battery 5 is a low voltage chargeable type, and it is connected to the common output of the intermediate DC-DC conversion units 2-1, 2-2 in order to prevent current leakage and to obtain an appropriate chargeable voltage for the battery.

Accordingly, although the current leakage can be reduced, it is very difficult to reduce a size of the apparatus and a cost thereof because the intermediate DC-DC conversion units is additionally provided in the power unit. Further, it is difficult to maintain high reliability of the apparatus because of the addition of such units.

In FIG. 2, two AC-DC conversion units 1-1, 1-2 are connected in parallel to the AC power source, and each of which converts the commercial AC voltage (AC 100V) to the high DC voltage (for example, DC 360V). In this example, two DC-DC conversion units 4 (4-1, 4-2) are provided instead of the intermediate DC-DC conversion units 2 and the DC-DC conversion units 3 of FIG. 1 for converting the high DC voltage to the actual low DC voltage. As shown in the drawing, each DC-DC conversion unit 4 is connected to the corresponding AC-DC conversion unit 1-1, 1-1.

In this example, the back-up battery is a high voltage chargeable type, and it is necessary to provide independently two back-up batteries 6 and 7. Further, each battery is connected independently to the corresponding output of the AC-DC conversion unit 1. That is, the back-up battery 6 is connected to the output of the AC-DC conversion unit 1-1, and the back-up battery 7 is connected to the output of the AC-DC conversion unit 1-2.

As explained above, in this example, since two back-up batteries 6 and 7 must be independently provided to each output of the AC-DC conversion unit 1 in order to prevent current leakage and to satisfy the back-up function, it is very difficult to reduce the size of the apparatus, and the cost thereof, because of the independent back-up batteries although the current leakage can be reduced. Further, it is difficult to maintain high reliability of the apparatus because of the provision of plural independent back-up batteries.

The object of the present invention is to provide a power supply apparatus with a back-up power unit which can prevent current leakage flowing from the current power unit to another power unit through a back-up power unit so that it is possible to reduce the size and cost of the apparatus and to maintain high reliability.

Figure 3:
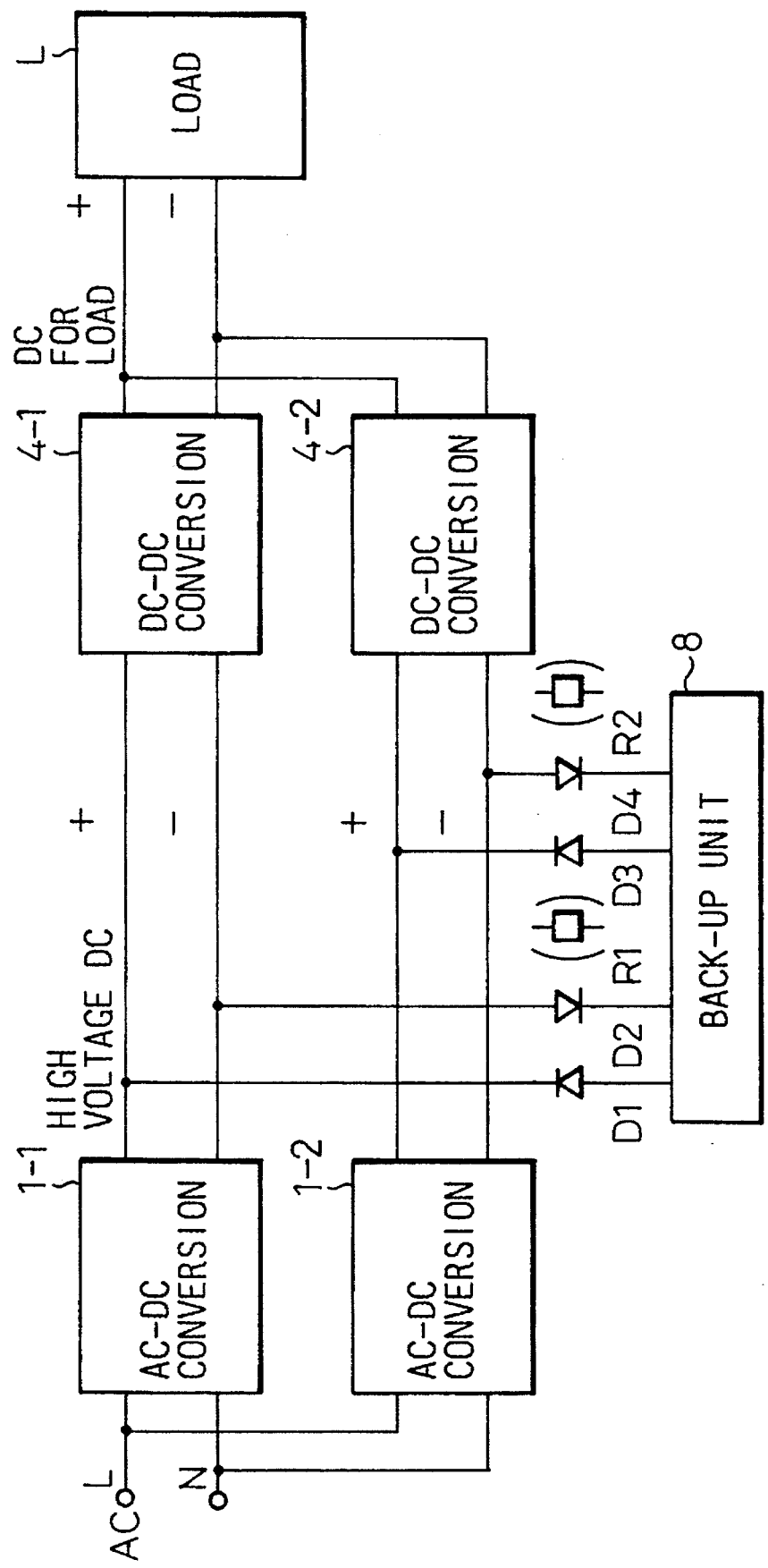
FIG. 3 shows one example of a power supply apparatus with a back-up power unit according to the present invention.

FIG. 3 shows one example of a power supply apparatus with a back-up power unit according to the present invention. The same reference numbers used in FIGS. 1 and 2 are attached to the same components in this drawing. Reference number 8 denotes a back-up unit according to the present invention. Further, D1 to D4 denotes diodes, and R1 and R2 denotes resistors.

As is obvious from the drawing, the present invention is preferably used for the power supply apparatus of the type shown in FIG. 2, but only one back-up power unit is provided in the present invention.

As explained in FIG. 2, two AC-DC conversion units 1-1, 1-2 are connected in parallel to the commercial AC power source, and each converts the commercial AC voltage to the high DC voltage. Further, two DC-DC conversion units 4-1, 4-2 are provided for converting the high DC voltage to the actual low voltage used for the load. Each of DC-DC conversion units 4-1, 4-2 is connected to the output of the corresponding AC-DC conversion unit 1-1, 1-1.

In the present invention, only one back-up unit 8 is connected to the output of the AC-DC conversion unit 1-1, through the diodes D1 and D2, and is connected to the output of the AC-DC conversion unit 1-2 through the diodes D3 and D4. The diodes D2 to D4 are used for preventing the current leakage flowing from the AC-DC conversion unit PSU-1 to the AC-DC conversion unit PSU-2 as explained in detail below.

In this structure, the diodes D1 and D3 are connected to the positive line, and the diodes D2 and D4 are connected to the negative line. As shown in the drawing, in the diodes D1 and D3, a cathode is connected to the positive line, and an anode is connected to the back-up unit 8. On the contrary, in the diodes D2 and D4, the cathode is connected to the back-up unit 8, and an anode is connected to the positive line.

Further, R1 and R2 denote resistors which are provided instead of the diodes D2 and D4. In this case, each resistance value of the resistor is defined so as to become very large value compared to a line impedance of the negative line of the AC-DC conversion unit 1 as explained in detail below.

Figure 4:
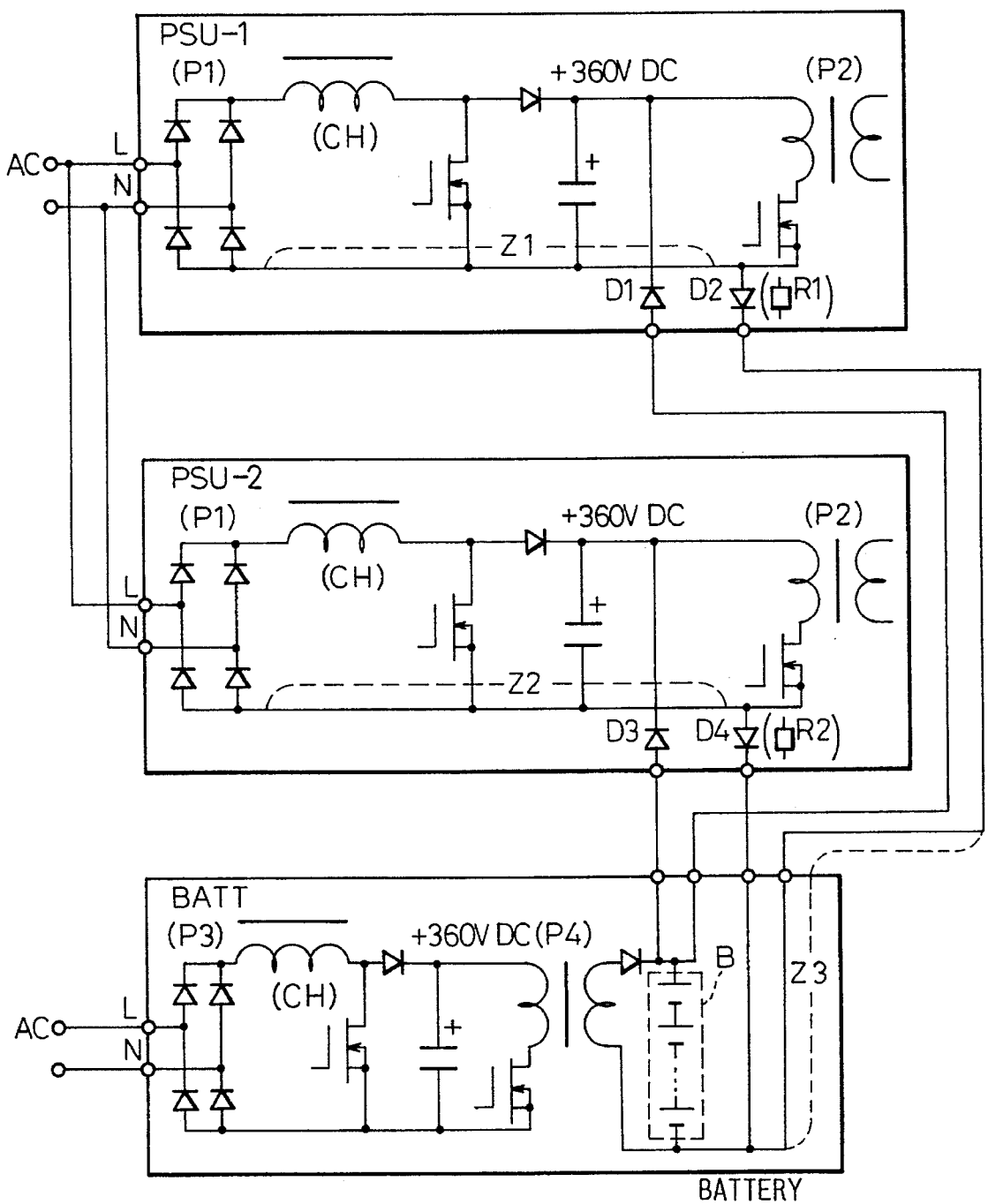
FIG. 4 is a detailed block diagram of a power supply apparatus with a back-up power unit according to a first embodiment of the present invention.
Figure 5:
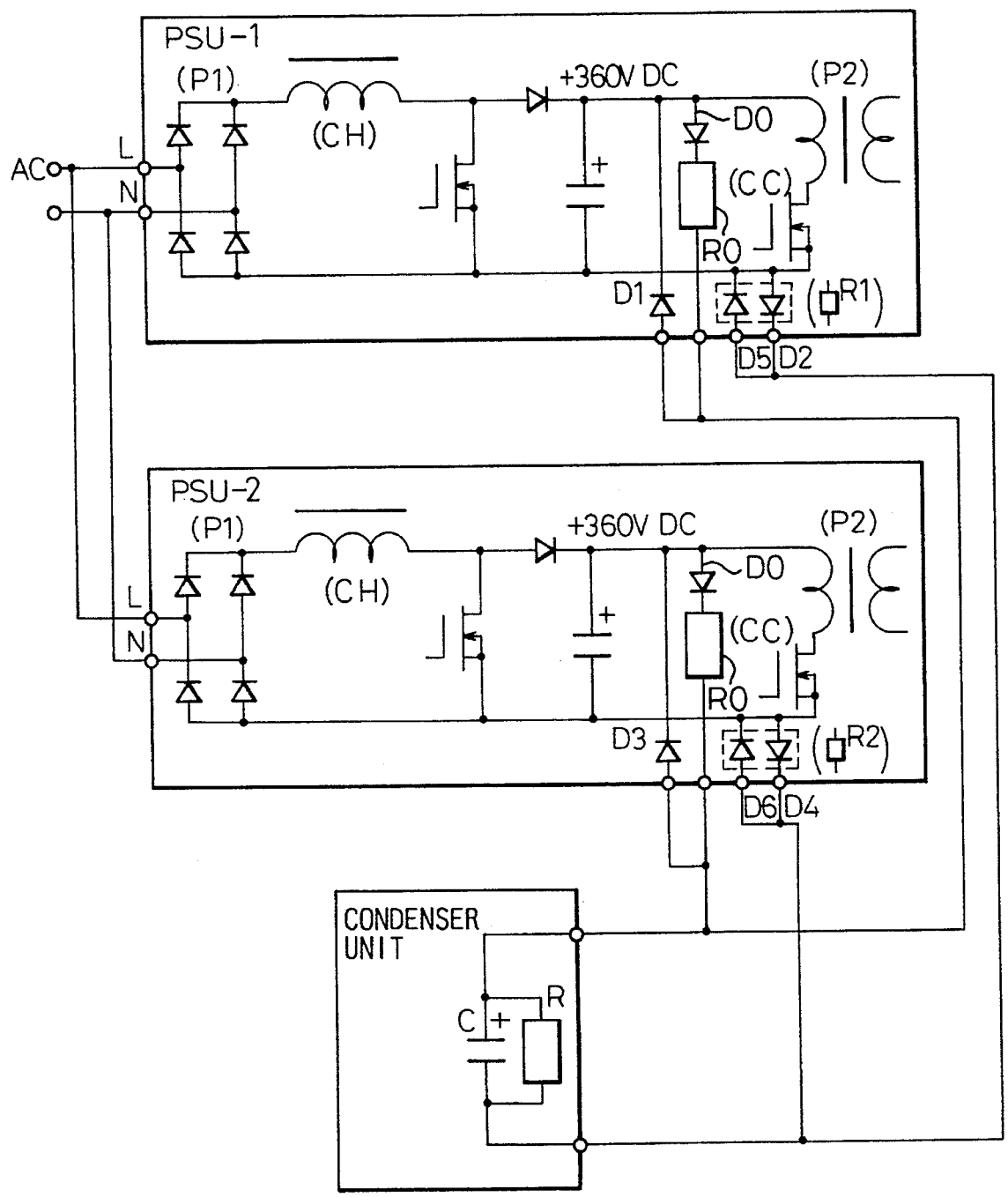
FIG. 5 a detailed block diagram of a power supply apparatus with a back-up power unit according to a second embodiment of the present invention.
Figure 6:
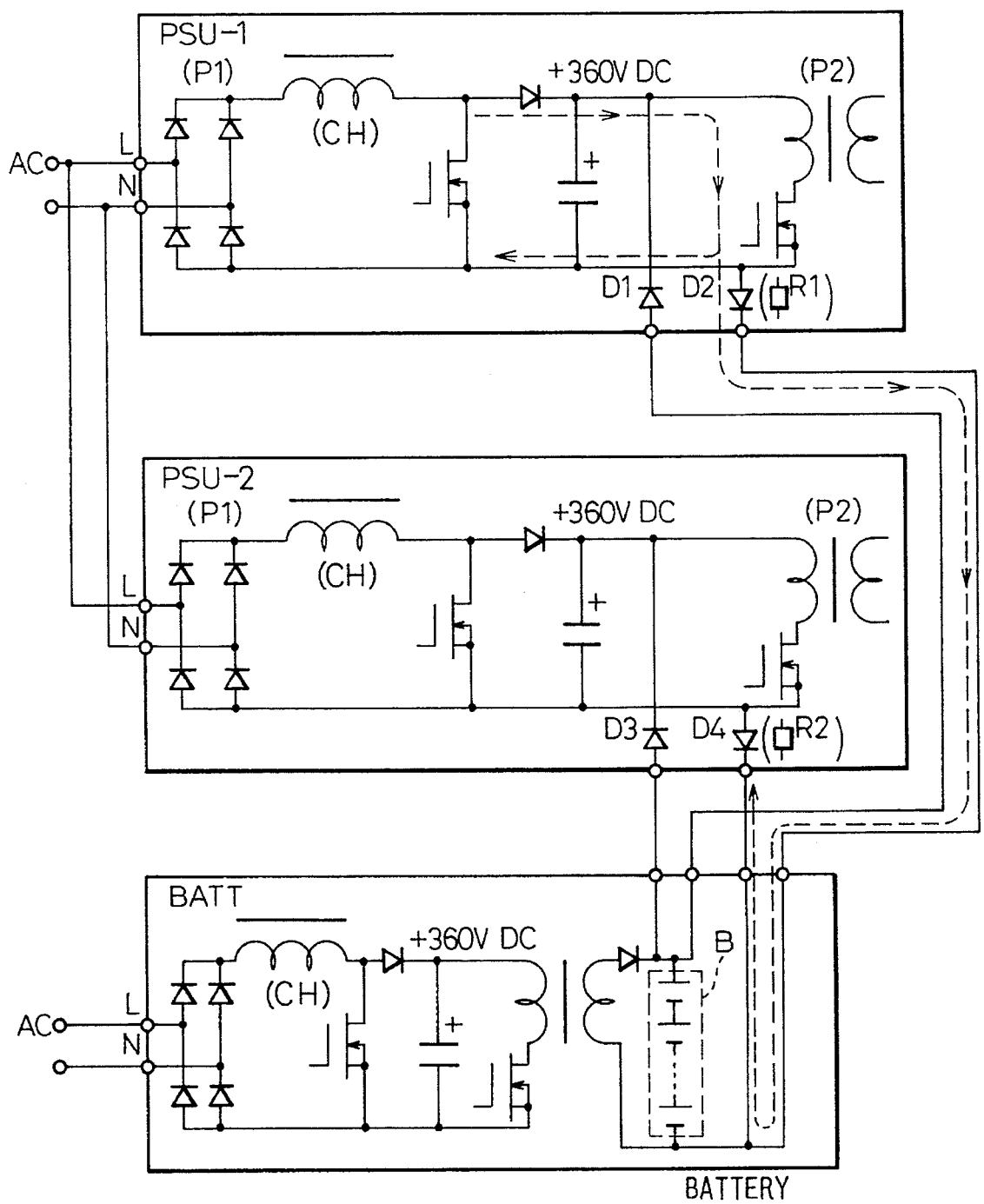
FIG. 6 is a view for explaining current flow in the first embodiment.

FIG. 4 is a detailed block diagram of a power supply apparatus with a back-up power unit according to a first embodiment of the present invention, FIG. 5 a detailed block diagram of a power supply apparatus with a back-up power unit according to a second embodiment of the present invention, and FIG. 6 is a view for explaining current flow in the first embodiment.

In these drawings, PSU (PSU-1, PSU-2) denotes the power unit including the AC-DC conversion unit 1 (1-1, 1-2) and the DC-DC conversion unit 4 (4-1, 4-2) in FIG. 3. That is, P1 corresponds to the AC-DC conversion unit 1-1 (1-2), and P2 corresponds to the DC-DC conversion unit 4-1 (4-2). Further, BATT denotes a back-up power unit, and B denotes the battery. Still further, Z1 and Z2 denotes the line impedance of the negative line of the AC-DC conversion unit P1, P2, and Z3 denotes the line impedance of the back-up unit BATT.

CH denotes a known chopper for raising the DC voltage rectified by the AC-DC conversion unit P1 to the high DC-voltage (for example, DC 360V). That is, first, the commercial AC voltage (AC 100V) is rectified by a voltage doubler so as to become DC 200V, next, the DC 200V is raised to the DC 360V by the chopper.

In the back-up power unit, P3 denotes another AC-DC conversion unit which converts the commercial AC power source to a high DC voltage, and P4 denotes the DC-DC conversion unit which converts the high DC voltage to a battery voltage. In a normal state (i.e., no failure occurs in the power supply apparatus), the battery B is charged by the DC-DC conversion unit P4.

In FIG. 5, a condenser unit can be used as the back-up unit instead of the battery. A condenser C is charged by a charging circuit CC in the normal state as explained in detail below.

In FIGS. 4 and 5, the diode D1 is connected between the positive line of the output of the AC-DC conversion unit P1 and the positive side of the battery B (or condenser C). In this case, both cathodes of the diodes D1, D3 are connected to the positive line, and both anodes thereof are connected to the positive side of the battery B (or condenser C).

Further, the diode D2 is connected between the negative line of the output of the AC-DC conversion unit P1 and the negative side of the battery B (or condenser C). In this case, the cathode of the diode is connected to the negative side of the battery B (or condenser C), and the anode is connected to the negative line of the AC-DC conversion unit P1.

In FIG. 6, as shown by dotted lines, in the normal state, the current flows from the positive line of the AC-DC conversion unit PSU-1 to the diode D4 of the AC-DC conversion unit PSU-2 passing through the diode D2 and the battery unit BATT. The current cannot flow into the negative line since the current is cut off by the diode D4.

On the other hand, the current flows from the positive line of the AC-DC conversion unit PSU-2 to the diode D2 of the AC-DC conversion unit PSU-1 passing through the diode D4 and the battery unit BATT. The current cannot flow into the negative line since the current is cut off by the diode D2.

Accordingly, it is possible to prevent the current leakage from the current power unit to another power unit. As is obvious, the diodes D1 and D3 can cut off the current leakage flowing from the positive line to the battery B.

When a failure occurs in the AC power source, the current flows from the positive side of the battery B (or condenser C) to the positive line of the AC-DC conversion unit P1 through diode D1 (D3) so that it is possible to supply the DC voltage of the battery B to the DC-DC conversion unit P2.

In FIGS. 4 and 5, the resistor R1 can be provided for the negative line of the AC-DC conversion unit P1 (PSU-1) instead of the diode D2, and the resistor R2 can be provided for the negative line of the AC-DC conversion unit P1 (PSU-2) instead of the diode D4. In FIG. 4, as mentioned above, Z1 and Z2 denote the line impedances of the negative lines of the AC-DC conversion units PSU-1 and PSU-2, and Z3 denotes the line impedance of the negative line of the battery.

In this embodiment, each value of the resistor is defined so as to become very large value compared to a line impedance of the negative line of the AC-DC conversion unit.

That is, the value of the resistor R1 is defined so as to become a very large value compared to the line impedance Z1 in order to prevent current flowing from the power unit PSU-1 to the power unit PSU-2. Accordingly, the current flows only on the negative line of the power unit PSU-1.

Similarly, the value of the resistor R2 is defined so as to become very large value compared to the line impedance Z2 in order to prevent current flowing from the power unit PSU-2 to the power unit PSU-1. Accordingly, the current flows only on the negative line of the power unit PSU-1.

In this case, the line impedance Z1 is basically equal to the line impedance Z2 because the power unit PSU-1 has basically equal structure of the power unit PSU-2. However, there is dispersion of the value between the line impedances Z1 and Z2 caused by dispersion of electric parts which forms the power unit. Accordingly, the values of the resistors R1 and R2 are defined independently in accordance with each of line impedances Z1 and Z2. In this case, the line impedance Z3 can be ignored when defining the values of the resistors R1 and R2.

In FIG. 5, in the normal state, the condenser C is charged by the charging circuit CC. That is, the current flows from the positive line of the power unit PSU-1 to the positive side of the condenser C through the diode D0 and the resistor R0 so that it is possible to charge the condenser C. The negative side of the condenser C is connected to the diode D5 so that the current flows from the negative side of the condenser C to the negative line of the power unit PSI-1 through the diode D5.

Similarly, in the power unit PSU-2, the current flows from the positive line of the power unit PSU-2 to the positive side of the condenser C through the diode D0 and the resistor R0 so that it is possible to charge the condenser C. The negative side of the condenser C is connected to the diode D6 so that the current flows from the negative side of the condenser C to the negative line of the power unit PSI-2 through the diode D6.

In this case, the diodes D2 and D5 are connected to the negative line in the opposite direction each other, and the diodes D4 and D6 are also connected to the negative line in the opposite direction each other.

However, the current does not flow from the negative line of the power unit PSU-1 to the negative line of the power unit PSU-2 through the diode D2 and the diode D6 because very large voltage drop occurs between the diodes D2 and D6. Accordingly, it is possible to prevent current leakage from the power unit PSU-1 to the power unit PSU-2 in this embodiment.

In the discharging state (i.e., when a failure occurs in the AC power source), the current flows from the condenser C to the positive line of the power unit PSU-1 through the diode D1, and returns from the negative line of the power unit PSU-1 to the negative side of the condenser C through the diode D2.

I claim:

1. A power supply apparatus with a back-up power unit comprising:

a plurality of AC-DC conversion means each connected in parallel to an AC power source, and each converting an AC voltage of said power source to a high DC voltage;

a plurality of DC-DC conversion means each connected to an output of each AC-DC conversion means, each converting the high DC voltage to a low DC voltage to be supplied to a load, and each output thereof connected in parallel to said load; and a back-up power means connected in parallel to the output of each AC-DC conversion means through a first and a second diode in order to supply the high DC voltage to the DC-DC conversion means when a failure occurs in said AC power source;

wherein the first diode is connected between a positive line of the AC-DC conversion means and a positive side of the back-up means in accordance with a connection direction in which the cathode of the first diode is connected to the positive line and the anode thereof is connected to the positive side, and the second diode is connected between a negative line of the AC-DC conversion means and a negative side of the back-up means in accordance with a connection direction in which the anode of the second diode is connected to the negative line and the cathode thereof is connected to the negative side.

2. A power supply apparatus as claimed in claim 1, wherein said back-up power means comprises a battery.

3. A power supply apparatus as claimed in claim 1, wherein said back-up power means comprises a condenser.

4. A power supply apparatus as claimed in claim 1, wherein a resistor is provided instead of the second diode, and said resistor has a very large resistance value compared to the line impedance of the negative line.

5. A power supply apparatus as claimed in claim 3, wherein said condenser is charged by the current flowing from the positive line of the AC-DC conversion means to the positive side of the condenser, and returns from the negative side to the negative line of the AC-DC conversion means through another diode which is connected to the negative line and has a direction opposite to the second diode, in a normal state which no failure occurs in the AC power source.

6. A power supply apparatus as claimed in claim 3, wherein said condenser is discharged by the current flowing from the positive side of the condenser to the positive line of the AC-DC conversion means through the first diode, and returns from the negative line of the AC-DC conversion means to the negative side through the second diode, when a failure occurs in the AC power source.

* * * * *